(12) United States Patent
Hong

(10) Patent No.: US 9,007,512 B2
(45) Date of Patent: Apr. 14, 2015

(54) FOCUSING METHOD OF PHOTOGRAPHING APPARATUS AND PHOTOGRAPHING APPARATUS ADOPTING THE FOCUSING METHOD

(71) Applicant: Samsung Techwin Co., Ltd., Changwon (KR)

(72) Inventor: Young-Taek Hong, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 48 days.

(21) Appl. No.: 13/953,990

(22) Filed: Jul. 30, 2013

(65) Prior Publication Data
US 2014/0218589 A1    Aug. 7, 2014

(30) Foreign Application Priority Data
Feb. 7, 2013  (KR) .......................... 10-2013-0014129

(51) Int. Cl.
*H04N 5/232* (2006.01)
*G03B 17/00* (2006.01)
*G03B 3/00* (2006.01)
*G03B 7/00* (2014.01)

(52) U.S. Cl.
CPC ................................ *H04N 5/23212* (2013.01)

(58) Field of Classification Search
USPC ..................... 348/345, 348; 396/77, 225, 124
See application file for complete search history.

(56) References Cited

U.S. PATENT DOCUMENTS

| 2004/0130650 A1 | 7/2004 | Lee et al. | |
| 2008/0037974 A1 * | 2/2008 | Chi | 396/102 |

FOREIGN PATENT DOCUMENTS

| JP | 63492 B2 | 3/1985 |
| KR | 100468871 B1 | 1/2005 |
| KR | 100906917 B1 | 7/2009 |

* cited by examiner

*Primary Examiner* — Joel Fosselman
(74) *Attorney, Agent, or Firm* — Sughrue Mion, PLLC

(57) ABSTRACT

A focusing method includes operations (a) through (d). In (a), a maximum focus value generated during a searching is set as a first maximum focus value. In (b), the focus lens moves to a first position that is the position of the first maximum focus value. In (c), a focus value generated when the focus lens moves to the first position is set as a second maximum focus value. In (d), if it is determined that a difference value between the first maximum focus value and the second maximum focus value is greater than a first set allowance value, a position of a focus value, whose difference value from the first maximum focus value is less than a second set allowance value, is searched for within a second range that has the first position as its center and is narrower than the first range.

6 Claims, 13 Drawing Sheets

FOCUSING METHOD OF PHOTOGRAPHING APPARATUS AND PHOTOGRAPHING APPARATUS ADOPTING THE FOCUSING METHOD

CROSS-REFERENCE TO RELATED PATENT APPLICATION

This application claims the benefit of Korean Patent Application No. 10-2013-0014129, filed on Feb. 7, 2013, in the Korean Intellectual Property Office, the disclosure of which is incorporated herein in its entirety by reference.

BACKGROUND

1. Field

Apparatuses and methods consistent with exemplary embodiments relate to a photographing method, and more particularly, to a focusing method of a photographing apparatus including a focus lens and a photoelectric conversion unit, and a photographing apparatus using the focusing method.

2. Description of the Related Art

In the related art, a photographing apparatus includes a focus lens, a photoelectric conversion unit, and a control unit. The photoelectric conversion unit may be a charge-coupled device (CCD) or a complementary metal-oxide-semiconductor (CMOS).

In a focusing method of a photographing apparatus, for example, an automatic focusing method of a security camera, a position at which a maximum focus value is generated is searched for by changing a distance between a focus lens and a photoelectric conversion unit.

For example, in a photographing apparatus including a focus motor, a position at which a maximum focus value is generated is searched for by changing a focus lens in a state where a photoelectric conversion unit is fixed.

By contrast, in a photographing apparatus including a motor of a photoelectric conversion unit, a position at which a maximum focus value is generated is searched for by moving the photoelectric conversion unit in a state where a focus lens is fixed. The photographing apparatus including the motor of the photoelectric conversion unit may be applied to various uses by replacing the focus lens.

When a maximum focus value is searched for and then a focus lens or a photoelectric conversion unit moves to a position of the maximum focus value, a focus value at the position does not correspond to the maximum focus value in many cases. That is, the focus lens and the photoelectric conversion unit may not be accurately placed at an actual position of the maximum focus value.

This seems to be caused by a gear connected to a driving motor of the photoelectric conversion unit or a focus motor.

FIG. 1 is a view illustrating a backlash B in the related art.

Referring to FIG. 1, when teeth of one pair of gears, for example, a pinion 11 and a rack 12, mesh with each other, the backlash BL exists as a clearance between mating surfaces of the teeth.

The backlash BL is a factor designed in consideration of deflection under load or thermal expansion.

However, in a gear connected to a motor of a photoelectric conversion unit or a focus motor, the backlash BL existing between the teeth of the pinion 11 close to the motor and the teeth of the rack 12 close to a lens may cause a focus lens or the photoelectric conversion unit to fail to be accurately placed at an actual position of a maximum focus value.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a focusing method for focusing a photographing apparatus which, after a maximum focus value is searched for, may enable a focus lens or a photoelectric conversion unit to be accurately placed at an actual position of the maximum focus value, and a photographing apparatus adopting the focusing method.

According to an aspect of an exemplary embodiment, there is provided a focusing method for focusing a photographing apparatus including a focus lens and a photoelectric conversion unit, the focusing method including operations of: (a) searching for a position of a maximum focus value by moving the focus lens within a first range, and setting the maximum focus value generated during the searching as a first maximum focus value; (b) moving the focus lens to a first position that is a position of the first maximum focus value; (c) setting a focus value generated when the focus lens moves to the first position as a second maximum focus value; and (d) determining whether a difference value between the first maximum focus value and the second maximum focus value is greater than a first set allowance value, and if it is determined that the difference value is greater than the first set allowance value, searching for a position of a focus value of which a difference value from the first maximum focus value is less than a second set allowance value, within a second range that has the first position as its center and is narrower than the first range.

In operation (d), if it is determined that the difference value is not greater than the first set allowance value, a position of the focus lens at a time of the determination may be used as a final focus position.

In operation (b), a direction of movement of the focus lens or a direction of movement of a motor moving the focus lens immediately before the focus lens is moved to the first position may be a set direction that is always the same.

In operation (d), the focus lens may move only in the set direction and within the second range, and the position of the focus lens at a time when the position of the focus value, of which a difference value from the first maximum focus value is less than the second set allowance value, may be used as a final focus position.

In operation (d), when the position of the focus value, of which a difference value from the first maximum focus value is less than the second set allowance value, is not found, a position of a focus value, of which a difference value from the first maximum focus value is the smallest within the second range, may be selected as a final focus position.

In operation (d), when the position of the focus value, of which a difference value from the first maximum focus value is less than the second set allowance value, is not found, the direction of movement of the focus lens or the direction of movement of the motor moving the focus lens immediately before the focus lens stops at the final focus position may be the set direction.

A sampling interval between positions at which a focus value is generated within the second range in operation (d)

may be narrower than a sampling interval between positions at which a focus value is generated within the first range in operation (a).

According to another aspect of an exemplary embodiment, there is provided a focusing method for focusing a photographing apparatus including a focus lens and a photoelectric conversion unit, the focusing method including operations of: (a) searching for a position of a maximum focus value by moving the focus lens by a first sampling interval within a first range, and setting a maximum focus value generated during the searching as a first maximum focus value; (b) searching for a position of a maximum focus value by moving the focus lens by a second sampling interval that is narrower than the first sampling interval, within a second range that has a first position of the first maximum focus value as its center and is narrower than the first range, and setting the maximum focus value generated during the searching as a second maximum focus value; (c) moving the focus lens to a second position that is a position of the second maximum focus value; (d) setting a focus value generated when the focus lens moves to the second position as a third maximum focus value; and (e) determining whether a difference value between the second maximum focus value and the third maximum focus value is greater than a first set allowance value, and if it is determined that the difference value is greater than the first set allowance value, searching for a position of a focus value of which a difference value from the second maximum focus value is less than a second set allowance value, within a third range that has the second position as its center and is narrower than the second range.

According to another aspect of an exemplary embodiment, there is provided a focusing method for focusing a photographing apparatus including a focus lens and a photoelectric conversion unit, the focusing method including operations of: (a) searching for a position of a maximum focus value by moving the photoelectric conversion unit within a first range, and setting the maximum focus value generated during the searching as a first maximum focus value; (b) moving the photoelectric conversion unit to a first position that is a position of the first maximum focus value; (c) setting a focus value generated when the photoelectric conversion unit moves to the first position as a second maximum focus value; and (d) determining whether a difference value between the first maximum focus value and the second maximum focus value is greater than a first set allowance value, and if it is determined that the difference value is greater than the first set allowance value, searching for a position of a focus value of which a difference value from the first maximum focus value is less than a second set allowance value, within a second range that has the first position as its center and is narrower than the first range.

In operation (d), if it is determined that the difference value is not greater than the first set allowance value, a position of the photoelectric conversion unit at a time of the determination may be used as a final focus position.

In operation (b), a direction of movement of the photoelectric conversion unit or a direction of movement of a motor moving the photoelectric conversion unit immediately before the photoelectric conversion unit stops at the first position may be a set direction that is always the same.

In operation (d), the photoelectric conversion unit may move only in the set direction within the second range, and the position of the photoelectric conversion unit at a time when the position of the focus value, of which a difference value from the first maximum focus value is less than the second set allowance value, may be used as a final focus position.

In operation (d), when the position of the focus value, of which a difference value from the first maximum focus value is less than the second set allowance value, is not found, a position of a focus value, of which a difference value from the first maximum focus value is the smallest, may be selected as a final focus position.

In operation (d), when the position of the focus value, of which a difference value from the first maximum focus value is less than the second set allowance value, is not found, the direction of movement of the photoelectric conversion unit or the direction of movement of the motor moving the photoelectric conversion unit immediately before the photoelectric conversion unit stops at the final focus position may be the set direction.

A sampling interval between positions at which a focus value is generated within the second range in operation (d) may be narrower than a sampling interval between positions at which a focus value is generated within the first range in operation (a).

According to another aspect of an exemplary embodiment, there is provided a focusing method for focusing a photographing apparatus including a focus lens and a photoelectric conversion unit, the focusing method including operations of: (a) searching for a position of a maximum focus value by moving the photoelectric conversion unit according to a first sampling interval within a first range, and setting the maximum focus value generated during the searching as a first maximum focus value; (b) searching for a position of a maximum focus value by moving the photoelectric conversion unit according to a second sampling interval that is narrower than the first sampling interval, within a second range that has a first position of the first maximum focus value as its center and is narrower than the first range, and setting a maximum focus value generated during the searching as a second maximum focus value; (c) moving the photoelectric conversion unit to a second position that is a position of the second maximum focus value; (d) setting a focus value generated when the photoelectric conversion unit moves to the second position as a third maximum focus value; and (e) determining whether a difference value between the second maximum focus value and the third maximum focus value is greater than a first set allowance value, and if it is determined that the difference value is greater than the first set allowance value, searching for a position of a focus value of which a difference value from the second maximum focus value is less than a second set allowance value, within a third range that has the second position as its center and is narrower than the second range.

According to another aspect of an exemplary embodiment, there is provided a photographing apparatus including a focus lens, a photoelectric conversion unit, and a control unit configured to perform focusing, wherein the control unit is further configured to: search for a position of a maximum focus value by moving the focus lens within a first range, and set the maximum focus value generated during the searching as a first maximum focus value; move the focus lens to a first position that is a position of the first maximum focus value; set a focus value generated when the focus lens moves to the first position as a second maximum focus value, and determine whether a difference value between the first maximum focus value and the second maximum focus value is greater than a first set allowance value, and if it is determined that the difference value is greater than the first set allowance value, search for a position of a focus value of which a difference value from the first maximum focus value is less than a second set allowance value, within a second range that has the first position as its center and is narrower than the first range.

According to another aspect of an exemplary embodiment, there is provided a photographing apparatus including a focus lens, a photoelectric conversion unit, and a control unit configured to perform focusing, wherein the control unit is further configured to: search for a position of a maximum focus value by moving the photoelectric conversion unit within a first range, and set the maximum focus value generated during the searching as a first maximum focus value; move the photoelectric conversion unit to a first position that is a position of the first maximum focus value; set a focus value generated when the photoelectric conversion unit moves to the first position as a second maximum focus value, and determine whether a difference value between the first maximum focus value and the second maximum focus value is greater than a first set allowance value, and if it is determined that the difference value is greater than the first set allowance value, search for a position of a focus value of which a difference value from the first maximum focus value is less than a second set allowance value, within a second range that has the first position as its center and is narrower than the first range.

According to a focusing method of a photographing apparatus, and a photographing apparatus adopting the focusing method of the one or more embodiments of the exemplary embodiments, when a maximum focus value is searched for and then a focus lens or a photoelectric conversion unit moves to a position of the maximum focus value, a position of a focus value closest to the maximum focus value is searched for again around the position, and the searched position is used as a final focus position.

Accordingly, a phenomenon in which a final focus position error occurs due to a backlash of a gear of a driving motor may be avoided. That is, the focus lens or the photoelectric conversion unit may be accurately placed at an actual position of a maximum focus value.

BRIEF DESCRIPTION OF THE DRAWINGS

The above and/or other aspects will be more apparent by describing certain exemplary embodiments with reference to the accompanying drawings, in which.

DETAILED DESCRIPTION OF THE INVENTION

Figure 1:
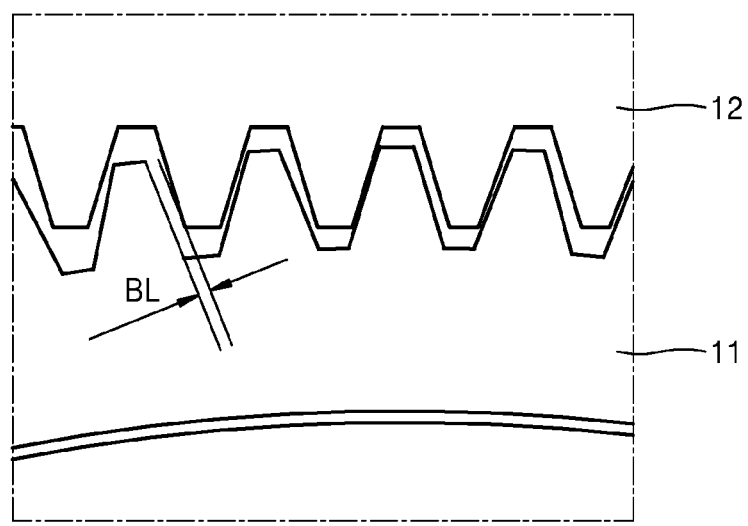
FIG. 1 is a view illustrating a backlash in the related art.

Certain exemplary embodiments are described in greater detail with reference to the accompanying drawings.

In the following description, like drawing reference numerals are used for the same elements, even in different drawings. The following description and the attached drawings are provided for better understanding of the exemplary embodiments, and well-known functions or constructions are not described in detail since they would obscure the exemplary embodiments with unnecessary detail.

Also, the descriptions and the drawings are not provided for limiting the exemplary embodiments, and the scope of the exemplary embodiments should be defined by the appended claims. The terms and words that are used in the present specification and the appended claims should be construed as meanings and concepts matching the technical spirit of the exemplary embodiments.

The exemplary embodiments will now be described more fully with reference to the accompanying drawings, in which exemplary embodiments are shown.

Figure 2:
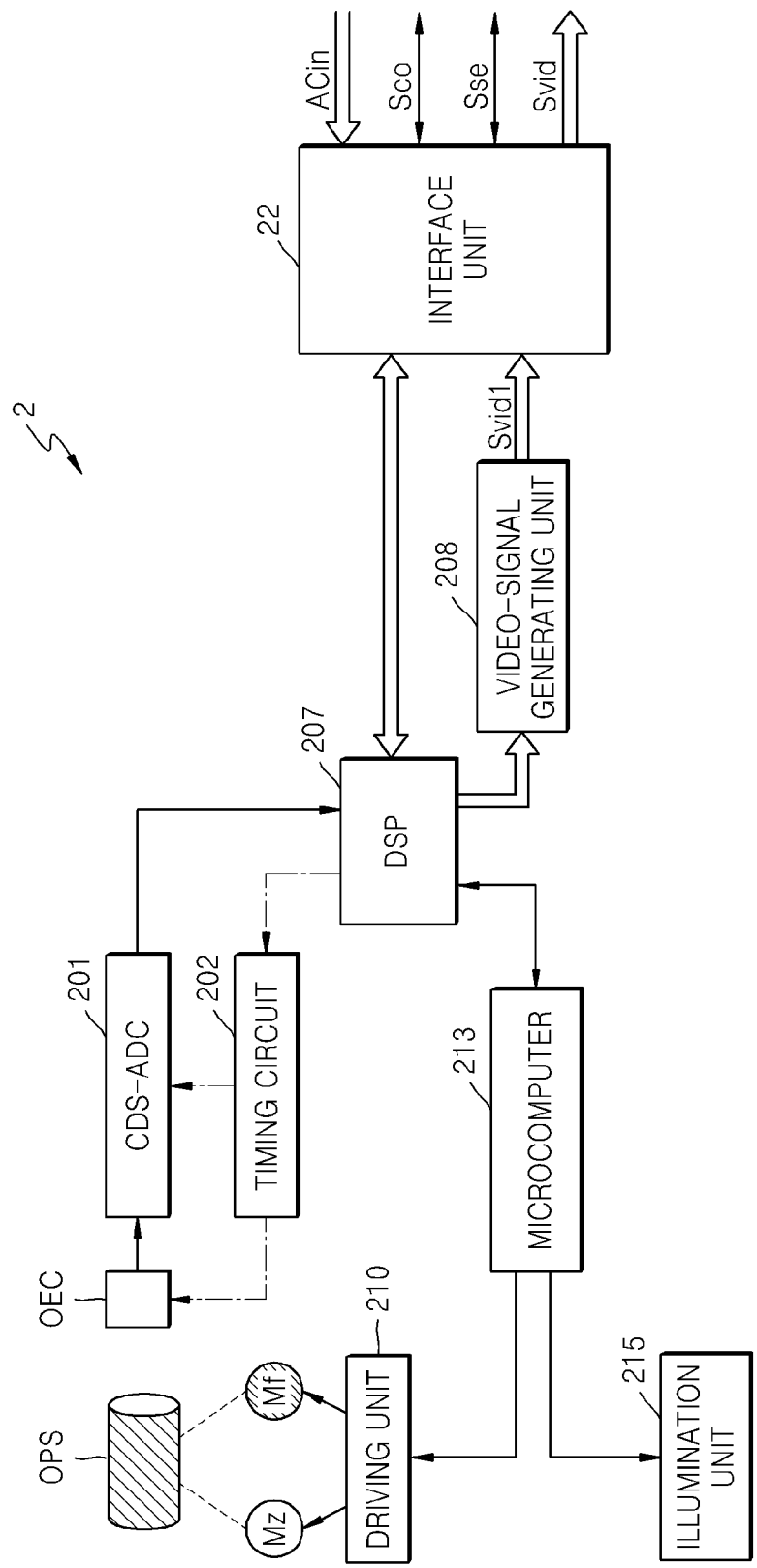
FIG. 2 is a block diagram illustrating a photographing apparatus according to an exemplary embodiment.

FIG. 2 is a block diagram illustrating a photographing apparatus 2 according to an exemplary embodiment.

Referring to FIG. 2, the photographing apparatus 2, for example, a security camera, includes an optical system OPS, a photoelectric conversion unit OEC, a correlated double sampler and analog-to-digital converter (CDS-ADC) 201, a digital signal processor (DSP) 207, a video-signal generating unit 208, and an interface unit 22.

The optical system OPS including a lens unit and a filter unit optically processes light from an object.

The lens unit of the optical system OPS includes a zoom lens and a focus lens. In the filter unit of the optical system OPS, an optical low-pass filter (OLPF) used in a night operation mode removes optical high-frequency noise, and an infrared cut-off filter (IRF) used in a day operation mode blocks infrared wavelengths of incident light.

The photoelectric conversion unit OEC, that is a charge-coupled device (CCD) or a complementary metal-oxide-semiconductor (CMOS), converts light output from the optical system OPS into an electrical analog signal. The DSP 207 controls operations of the photoelectric conversion unit OEC and the CDS-ADC 201 by controlling a timing circuit 202.

The CDS-ADC 201 that acts as a digital signal generating unit processes an analog image signal output from the photoelectric conversion unit OEC and generates a digital image signal. In detail, the CDS-ADC 201 processes an analog image signal output from the photoelectric conversion unit OEC to remove high-frequency noise and adjust an amplitude, and generates digital image data. The digital image data is input to the DSP 207.

The DSP 207 converts a format of a digital image signal output from the CDS-ADC 201 by controlling operations of the optical signal OPS, the photoelectric conversion unit OEC, and the CDS-ADC 201 that act as a digital signal generating unit. In detail, the DSP 207 processes a digital signal output from the CDS-ADC 201 and generates a digital image signal that is separated into a luminance signal and a chrominance signal.

The video signal generating unit 208 converts a digital image signal output from the DSP 207 into a video signal Svid1 that is an analog image signal.

The DSP 207 communicates with a host device (not shown) via the interface unit 22, and transmits the video signal Svid1 output from the video signal generating unit 208 to the host device.

A microcomputer 213 that operates under the control of the DSP 207 controls a driving unit 210 to drive a zoom motor Mz and a focus motor Mf. The zoom motor Mz drives the zoom lens, and the focus motor Mf drives the focus lens.

Also, the microcomputer 213 drives an illumination unit 215 under the control of the DSP 207.

The interface unit 22 rectifies an input alternating current voltage ACin, applies a direct current voltage to each unit, and interfaces communication signals Sco between the DSP 207 and the host device.

Also, the interface unit 22 interfaces the video signal Svid1 output from the video signal generating unit 208, outputs a resultant video signal Svid through a Bayonet Neill-Concelman (BNC) receptacle, and interfaces a communication signal Sse between the DSP 207 and external sensors.

Figure 3:
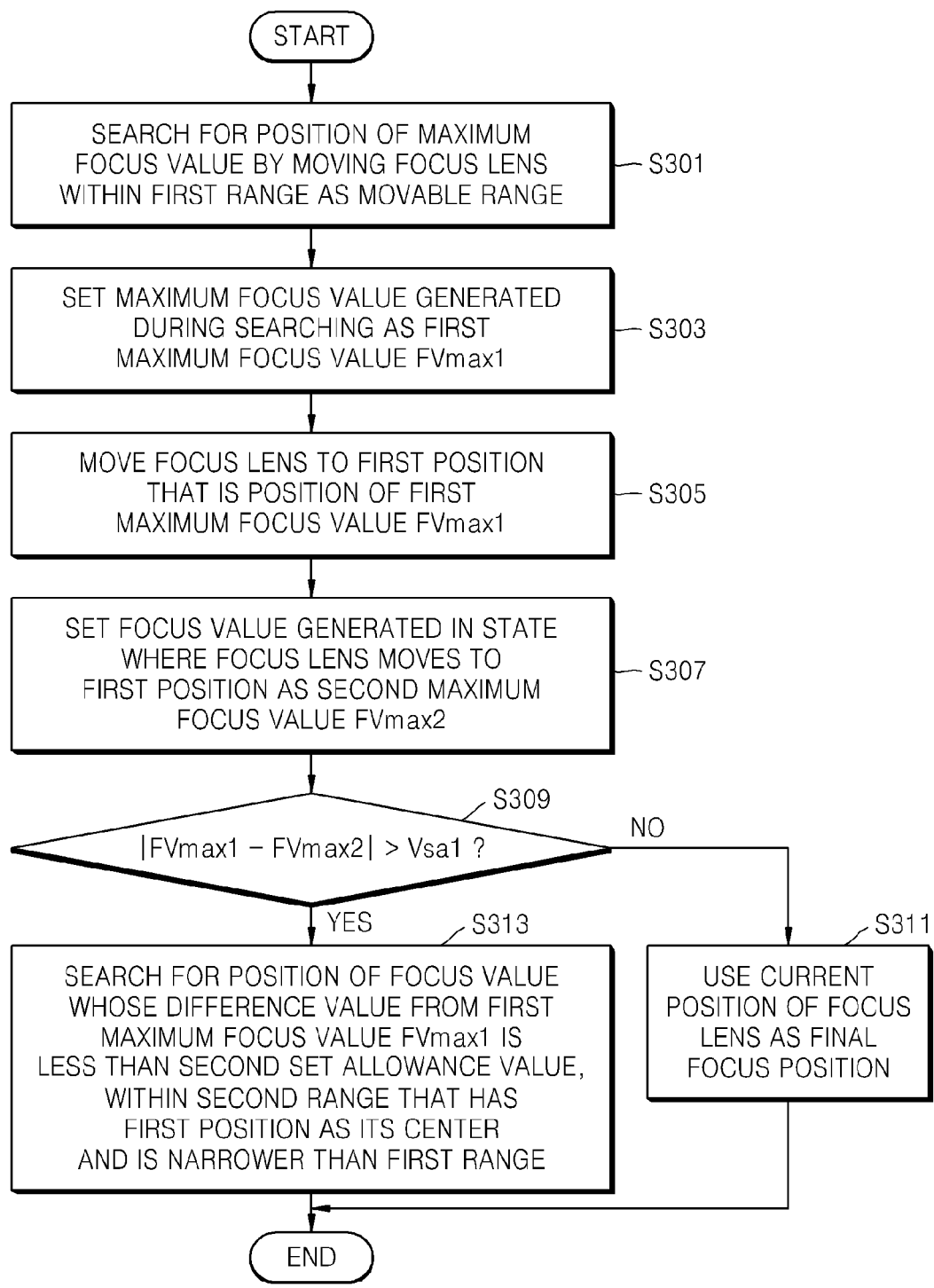
FIG. 3 is a flowchart illustrating a focusing method performed by a digital signal processor (DSP) that acts as a control unit in the photographing apparatus of FIG. 2, according to an exemplary embodiment.
Figure 4:
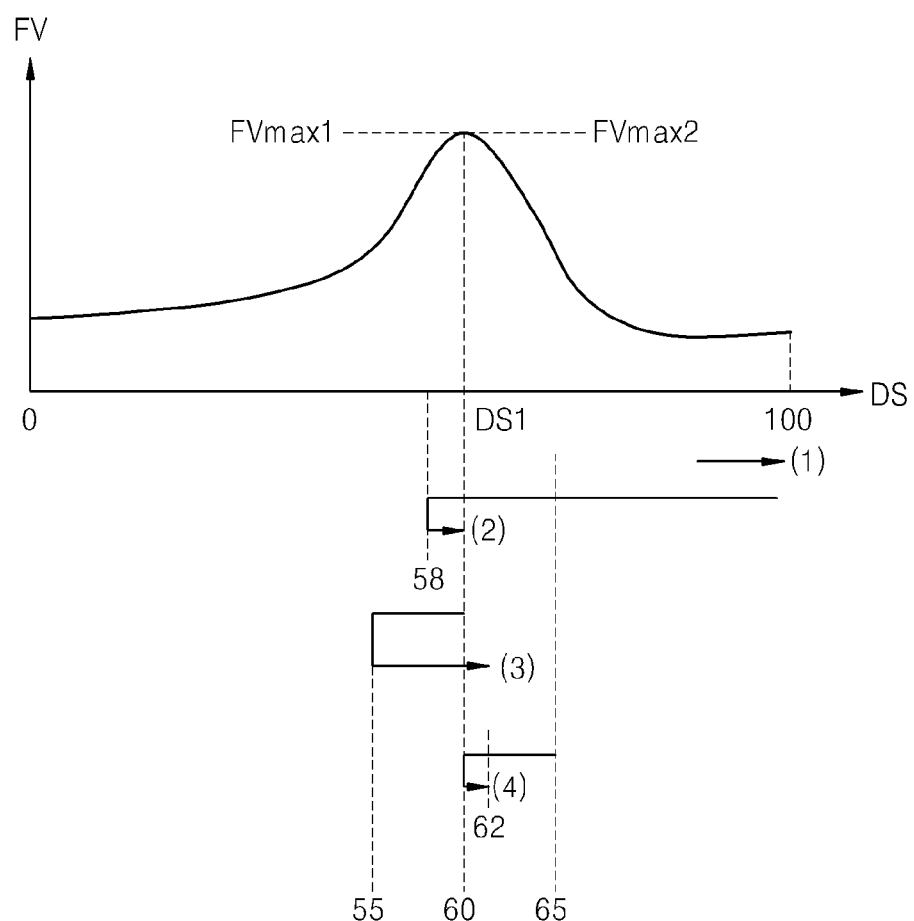
FIG. 4 is a graph illustrating the focusing method of FIG. 3.

FIG. 3 is a flowchart illustrating a focusing method performed by the DSP 207 that acts as a control unit in the photographing apparatus 2 of FIG. 2, according to an exemplary embodiment. FIG. 4 is a graph illustrating the focusing method of FIG. 3. In FIG. 4, a reference symbol FV denotes a focus value, and DS denotes a position of the focus lens in the optical system OPS (see FIG. 2). In the current exemplary embodiment, a position value of the position DS of the focus lens in the optical system Ops is a driving step number of the focus motor Mf (see FIG. 2).

A focusing method performed by the DSP 207 that acts as a control unit in the photographing apparatus 2 of FIG. 2 according to an exemplary embodiment will now be explained with reference to FIGS. 2 through 4.

In operation S301, the DSP 207 controls the microcomputer 213 to search for a position of a maximum focus value by moving the focus lens in the optical system OPS within a first range from 0 to 100, which is a movable range. An arrow 1 in FIG. 4 indicates the end of operation S301.

In this search process, a movement direction of the focus lens, that is, a rotation direction of the focus motor Mf, is constantly used as a set direction. In the current exemplary embodiment, the focus lens moves in a direction in which the position value of the position DS of the focus lens increases. A reason why a constant movement direction of the focus lens is used in this search process so that a rotation direction right before the focus motor Mf temporarily stops is constantly used at a time when the focus lens temporarily stops and the focus value FV is generated. That is, since a rotation direction right before the focus lens Mf temporarily stops is constantly used, inaccuracy due to a backlash of a gear may be reduced.

In operation S303, the DSP 207 sets a maximum focus value from among focus values generated in operation S301 as a first maximum focus value FVmax1.

In operation S305, the DSP 207 moves the focus lens in the optical system OPS to a first position DS1 that is a position of the first maximum focus value FVmax1. An arrow 2 in FIG. 4 indicates the end of operation S305. A movement direction right before the focus lens stops at the first position DS1 is constantly used by the set direction. For example, in order to constantly use a rotation direction right before the focus motor Mf stops, the focus lens at the position DS of "100" does not directly stop at the first position DS1 of "60", but stops at the first position DS1 of "60" after passing through position values as follows: "100"->"60"->"58"->"60".

In operation S307, the DSP 207 sets the focus value FV generated in a state where the focus lens moves to the first position DS1 as a second maximum focus value FVmax2.

In operation S309, the DSP 207 compares a difference value between the first maximum focus value FVmax1 and the second maximum focus value FVmax2 with a first set allowance value Vsa1.

When it is determined in operation S309 that the difference value between the first maximum focus value FVmax1 and the second maximum focus value FVmax2 is not greater than the first set allowance value Vsa1, the focusing method proceeds to operation S311. In operation S311, the DSP 207 uses the first position DS1 of the focus lens at a time of the determination as a final focus position. That is, in FIG. 4, a point at which the arrow 2 ends is used as a final focus position.

When it is determined in operation S309 that the difference value between the first maximum focus value FVmax1 and the second maximum focus value FVmax2 is greater than the first set allowance value Vsa1, the focusing method proceeds to operation S313. In operation S313, the DSP 207 searches for the position DS of the focus value FV, whose difference value from the first maximum focus value FVmax1 is less than a second set allowance value Vsa2, within a second range from 55 to 65 that has the first position DS1 as its center and is narrower than the first range from 0 to 100. An arrow 3 in FIG. 4 indicates a movement path of the focus lens in operation S313.

That is, when the first maximum focus value FVmax1 is searched for and then the focus lens moves to a position of the first maximum focus value FVmax1, the position DS of the focus value FV, which is closest to the first maximum focus value FVmax1, is searched for again around the position, and the position found by the search is used as a final focus position.

Accordingly, in a non-limiting example, a phenomenon in which a final focus position error occurs due to a backlash of a gear of a driving motor may be solved. That is, the focus lens may be accurately placed at an actual position of a maximum focus value.

In operation S313, the second set allowance value Vsa2 may be the same as the first set allowance value Vsa1, or may be set to be different from the first set allowance value Vsa1 according to various situations.

Also, in operation S313, the focus lens moves only in the set direction within the second range from 55 to 65, and a position of the focus lens at a time when the position DS of the focus lens, whose difference value from the first maximum focus value FVmax1 is less than the second set allowance value Vsa2, is first found is used as a final focus position.

Also, when the position DS of the focus value FV, whose difference value from the first maximum focus value FVmax1 is less than the second set allowance value Vsa2, is not found in operation S313, a position of a focus value, whose difference value from the first maximum focus value FVmax1 is the smallest within the second range from 55 to 65, is selected as a final focus position. In this case, an arrow 4 in FIG. 4 indicates a movement path of the focus lens. A movement direction right before the focus lens stops at a final focus position is constantly used by the set direction. That is, a rotation direction right before the focus lens Mf stops is constantly used. Put another way, a direction of movement of the focus lens or a direction of movement of a motor moving the focus lens immediately before the focus lens is moved to the first position is always the same. For example, when a position value of the selected focus position is "62", the focus lens at the position DS of "65" does not directly stop at a position of "62", but stops at the position of "62" after passing through position values as follows: "65"->"62"->"60"->"62".

A sampling interval between positions at which the focus value FV is generated within the second range from 55 to 65 in operation S313 is narrower than a sampling interval between positions at which the focus value FV is generated within the first range from 0 to 100. For example, when a sampling interval for the position DS of the focus lens in operation S301 is "2", a sampling interval for the position DS of the focus lens in operation S313 is "1".

Figure 5:
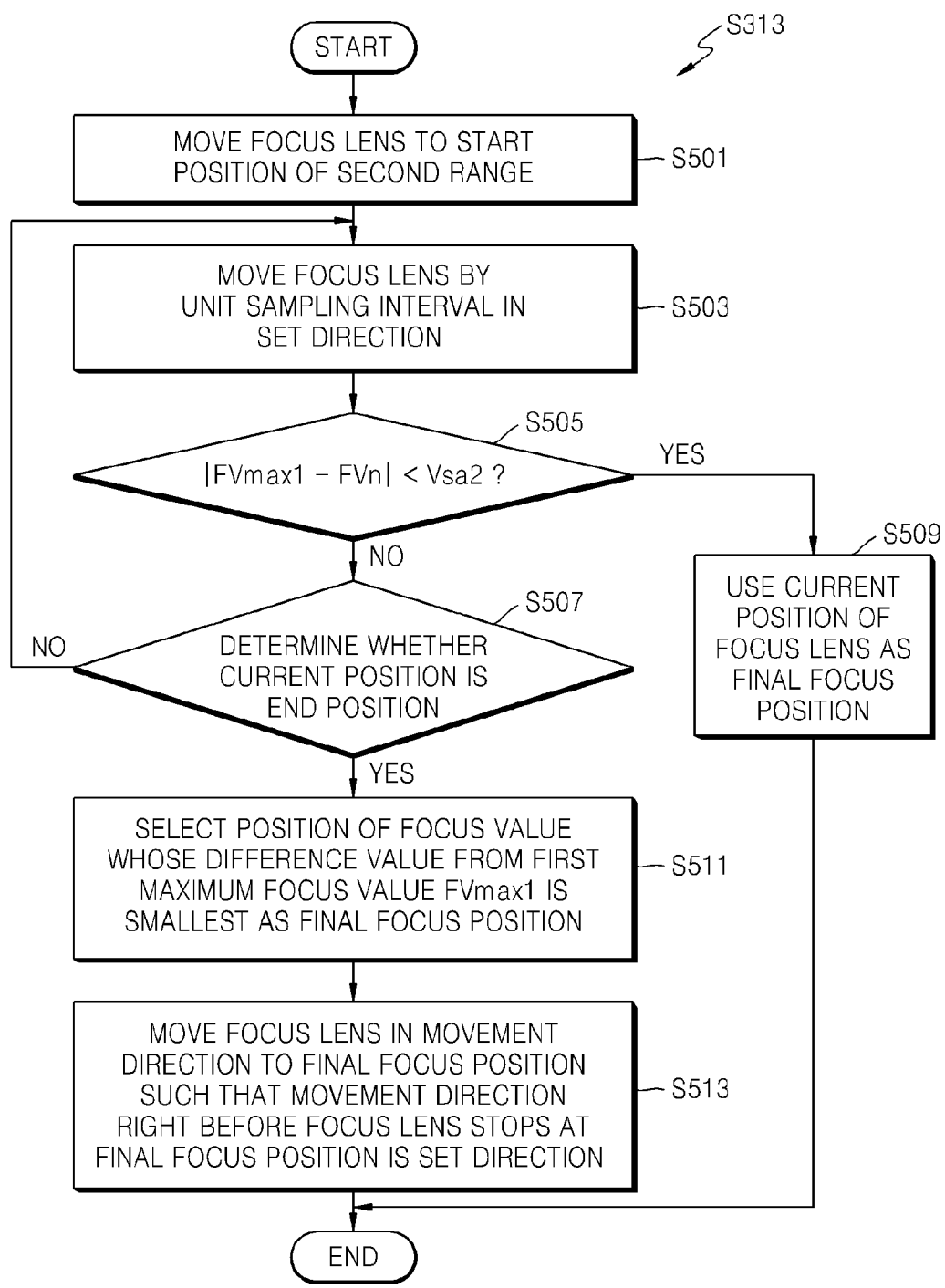
FIG. 5 is a flowchart illustrating an operation of setting a first maximum focus value in the focusing method of FIG. 3.

FIG. 5 is a flowchart illustrating operation S313 of the focusing method of FIG. 3. Operation S313 of the focusing method of FIG. 3 will be explained in detail with reference to FIGS. 2, 4, and 5.

In operation S501, the DSP 207 that controls the microcomputer 213 moves the focus lens in the optical system OPS to a start position of 55 of the second range from 55 to 65.

In operation S503, the DSP 207 moves the focus lens in the optical system OPS in the set direction by a unit sampling interval of "1".

As described above, the reason why a movement direction of the focus lens in a search process is constantly used is that a rotation direction right before the focus motor Mf temporarily stops is constantly used at a time when the focus lens temporarily stops and the focus value FV is generated. That is, since a rotation direction right before the focus motor Mf temporarily stops is constantly used, inaccuracy due to a backlash of a gear may be reduced.

In operation S505, the DSP 207 determines whether a difference value between the first maximum focus value FVmax1 and a current focus value FVn is less than the second set allowance value Vsa2.

When it is determined in operation S505 that the difference value between the first maximum focus value FVmax1 and the current focus value FVn is less than the second set allowance value Vsa2, the focusing method proceeds to operation S509. In operation S509, the DSP 207 uses a current position of the focus lens as a final focus position.

When it is determined in operation S505 that the difference value between the first maximum focus value FVmax1 and the current focus value FVn is not less than the second set allowance value Vsa2, the focusing method proceeds to operation S507. In operation S507, the DSP 207 determines whether the current position is an end position.

When it is determined in operation S507 that the current position is not an end position, operation S503 and subsequent operations are repeatedly performed. When it is determined in operation S507 that the current position is an end position, operations S511 and S513 are performed.

Since the DSP 207 does not find the position DS of the current focus value FVn whose difference value from the first maximum focus value FVmax1 is less than the second set allowance value Vsa2, in operation S511 a position of 62, whose difference value from the first maximum focus value FVmax1 is the smallest, is selected as a final focus position.

In operation S513, the DSP 207 moves the focus lens in a movement direction to a final focus position such that the movement direction right before the focus lens stops at the final focus position is the set direction. In this case, the arrow 4 in FIG. 4 indicates a movement path of the focus lens. For example, when a position value of the selected final focus position is "62", the focus lens at the position DS of "65" does not directly stop at the position of "62", but stops at the position of "62" after passing through position values as follows: "65"->"62"->"60"->"62".

Figure 6:
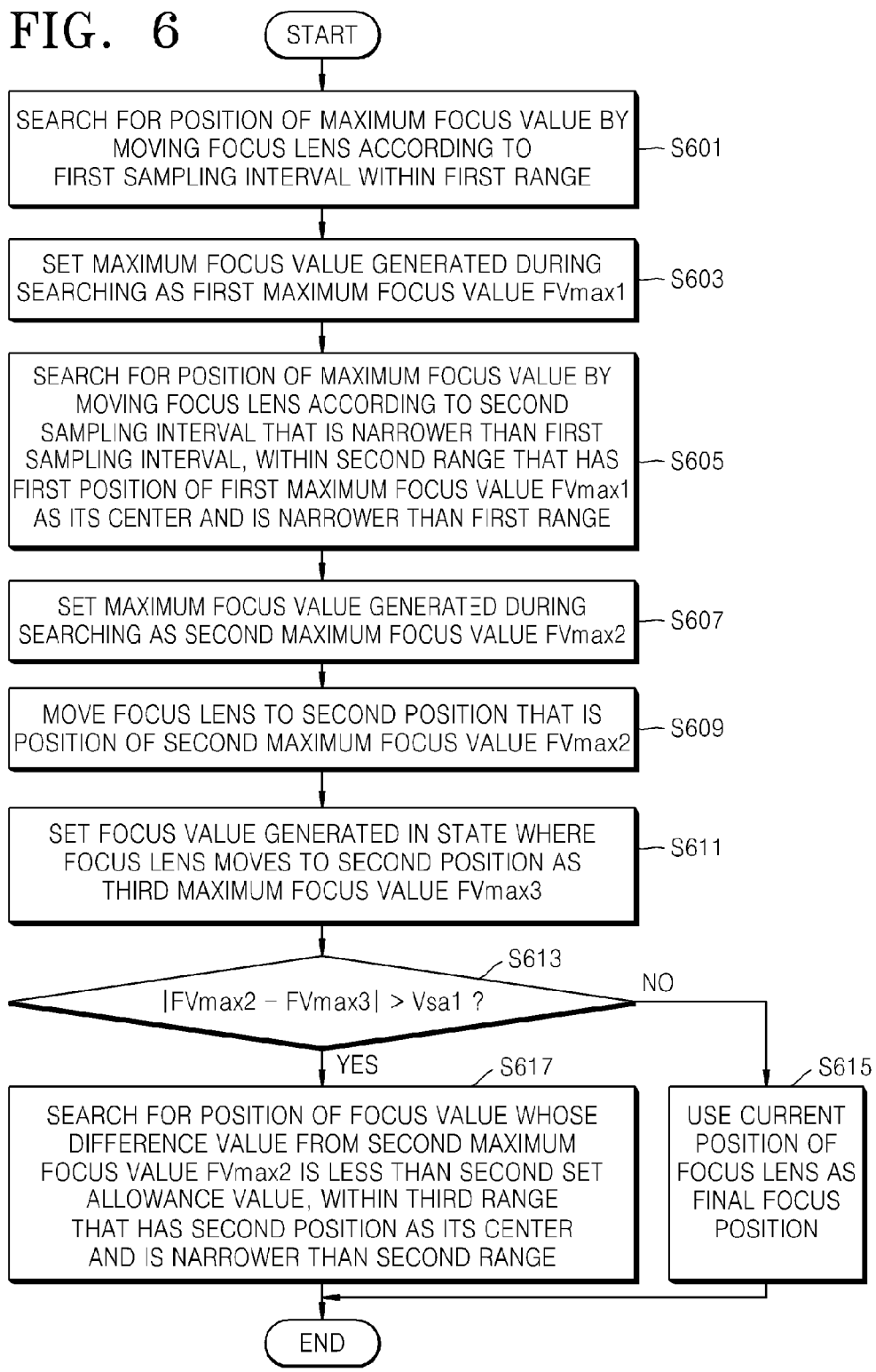
FIG. 6 is a flowchart illustrating a focusing method performed by the DSP that acts as a control unit in the photographing apparatus of FIG. 2, according to another exemplary embodiment.
Figure 7:
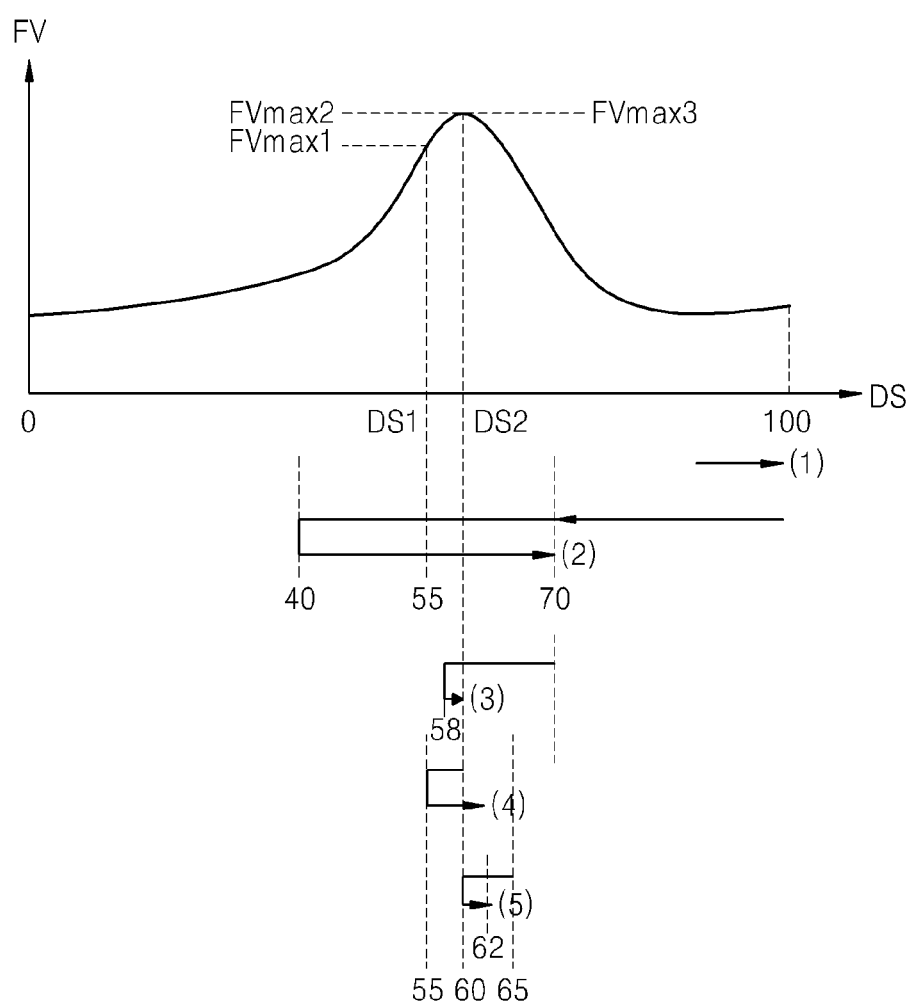
FIG. 7 is a graph illustrating the focusing method of FIG. 6.

FIG. 6 is a flowchart illustrating a focusing method performed by the DSP 207 that acts as a control unit in the photographing apparatus 2 of FIG. 2, according to another exemplary embodiment. Focusing using the focusing method of FIG. 6 may end earlier than focusing using the focusing method of FIG. 3. FIG. 7 is a graph for explaining the focusing method of FIG. 6. In FIG. 7, reference symbol FV denotes a focus value and DS denotes a position of the focus lens in the optical system OPS (see FIG. 2). In the current exemplary embodiment, a position value of the position DS of the focus lens in the optical system OPS is a driving step number of the focus motor Mf (see FIG. 2).

A focusing method performed by the DSP 207 that acts as a control unit in the photographing apparatus 2 of FIG. 2 according to another exemplary embodiment will now be explained with reference to FIGS. 2, 6, and 7.

In operation S601, the DSP 207 controls the microcomputer 213 to search for a position of a maximum focus value by moving the focus lens in the optical system OPS according to a first sampling interval (for example, 4 driving steps) within a first range from 0 to 100, which is a movable range. An arrow 1 in FIG. 7 indicates the end of operation S601.

In operation S603, the DSP 207 sets a maximum focus value from among focus values generated in operation S601 as the first maximum focus value FVmax1.

In operation S605, the DSP 207 searches for a position of the maximum focus value by moving the focus lens in the optical system OPS according to a second sampling interval (for example, 2 driving steps) that is narrower than the first sampling interval, within a second range from 40 to 70 that has the first position DS1 of the first maximum focus value FVmax1 as its center and is narrower than the first range from 0 to 100. An arrow 2 in FIG. 7 indicates a movement path of the focus lens in operation S605.

In operation S607, the DSP 207 sets a maximum focus value generated in operation S605 as the second maximum focus value FVmax2.

In operation S609, the DSP 207 moves the focus lens in the optical system OPS to a second position DS2 that is a position of the second maximum focus value FVmax2. An arrow 3 in operation FIG. 7 indicates the end of operation S609.

As described above, a movement direction right before the focus lens stops at the second position DS2 is constantly used by a set direction. For example, in order to constantly use a rotation direction right before the focus motor Mf stops, the focus lens at a position of "70" does not directly stop at the second position DS2 of "60", but stops at the second position DS2 of "60" after passing through position values as follows: "70"->"60"-"58"->"60".

In operation S611, the DSP 207 sets the focus value FV generated in a state where the focus lens moves to the second position DS2 as a third maximum focus value FVmax3.

In operation S613, the DSP 207 compares a difference value between the second maximum focus value FVmax2 and the third maximum focus value FVmax2 with the first set allowance value Vsa1.

When it is determined in operation S613 that the difference value between the second maximum focus value FVmax2 and the third maximum focus value FVmax3 is not greater than the first set allowance value Vsa1, the focusing method proceeds to operation S615. In operation S615, the DSP 207 uses a current position, that is, the second position DS2, of the focus lens at a time of the determination as a final focus position. That is, a point at which the arrow 3 in FIG. 7 ends is used as a final focus position.

When it is determined in operation S613 that the difference value between the second maximum focus value FVmax2 and the third maximum focus value FVmax3 is greater than the first set allowance value Vsa1, the focusing method proceeds operation S617. In operation S617, the DSP 207 searches for the position DS of the focus value FV, whose difference value from the second maximum focus value FVmax2 is less than the second set allowance value Vsa2, within a third range from 55 to 65 that has the second position DS2 as its center and is narrower than the second range from 40 to 70. An arrow 4 in FIG. 7 indicates a movement path of the focus lens in operation S617. Operation S617 is the same as operation S313 of FIG. 3.

For example, in operation S617, the focus lens moves only in the set direction within the third range from 55 to 65, and a position of the focus lens at a time when the position DS of the focus value FV, whose difference value from the second maximum focus value FVmax2 is less than the second set allowance value Vsa2, is first found is used as a final focus position.

When the position DS of the focus lens FV, whose difference value from the second maximum focus value FVmax2 is less than the second set allowance value Vsa2, is not found in operation S617, a position of a focus value (for example, a position of 62), whose difference value from the second maximum focus value FVmax2 is the smallest within the third range from 55 to 65, is used as a final focus position. In this case, an arrow 5 in FIG. 7 indicates a path through which the focus lens moves from a position "65" to a final focus position of "62".

In sum of FIG. 6, when the second maximum focus value FVmax2 is searched for and then the focus lens moves to a position of the second maximum focus value FVmax2, the position DS of the focus value FV that is closest to the second maximum focus value FVmax2 is searched for again around the position, and the position found by the search is used as a final focus position.

Accordingly, in a non-limiting example, a phenomenon in which a final focus position error occurs due to a backlash of a gear of a driving motor may be solved. That is, the focus lens may be accurately placed at an actual position of a maximum focus value.

Figure 8:
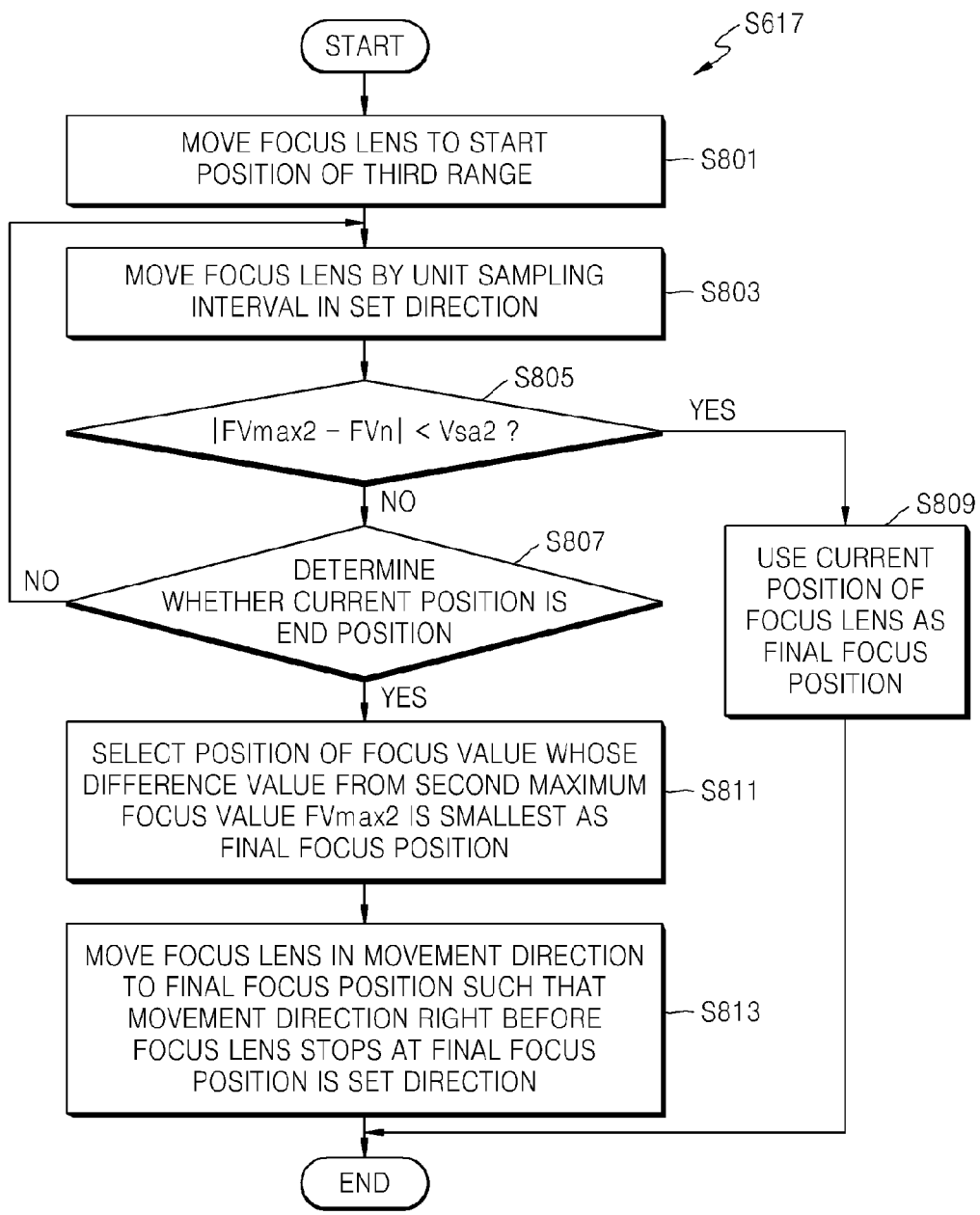
FIG. 8 is a flowchart illustrating an operation of searching for a position of a focus value, whose difference value from a second maximum focus value is less than a second set allowance value, in the focusing method of FIG. 6.

FIG. 8 is a flowchart illustrating operation S617 of the focusing method of FIG. 6. Operation S617 of the focusing method of FIG. 6 will be explained in detail with reference to FIGS. 1, 7, and 8.

In operation S801, the DSP 207 that controls the microcomputer 213 moves the focus lens in the optical system OPS to the start position of 55 of the third range from 55 to 65.

In operation S803, the DSP 207 moves the focus lens in the optical system OPS in the set direction by a unit sampling interval of "1".

In operation S805, the DSP 207 determines whether a difference value between the second maximum focus value FVmax2 and the current focus value FVn is less than the second set allowance value Vsa2.

When it is determined in operation S805 that the difference value between the second maximum focus value FVmax2 and the current focus value FVn is less than the second set allowance value Vsa2, the focusing method proceeds to operation S809. In operation S809, the DSP 207 uses a current position of the focus lens as a final focus position.

When it is determined in operation S805 that the difference value between the second maximum focus value FVmax2 and the current focus value FVn is not less than the second set allowance value Vsa2, the focusing method proceeds to operation S807. In operation S807, the DSP 207 determines whether the current position is an end position.

When it is determined in operation S807 that the current position is not an end position, operation S803 and subsequent operations are repeatedly performed, and when it is determined in operation S807 that the current position is an end position, operation S811 and operation S813 are performed.

Since the DSP 207 does not find the position DS of the current focus value FVn, whose difference value from the second maximum focus value FVmax2, is less than the second set allowance value Vsa2, in operation S811 a position of a focus value (for example, a position of 62), whose difference value from the second maximum focus value FVmax2 is the smallest within the third range from 55 to 65, is selected as a final focus position.

In operation S813, the DSP 207 moves the focus lens in a movement direction to a final focus position such that the movement direction right before the focus lens stops at the final focus position is the set direction. In this case, the arrow 5 in FIG. 7 indicates a movement path of the focus lens.

Table 1 shows resultant values (hexadecimal values) of (FVmax3−FVmax2) in operation S613 of FIG. 6 obtained after performing a focusing test 10 times.

TABLE 1

| Test No. | FVmax2 | FVmax3 | FVmax3 − FVmax2 |
| --- | --- | --- | --- |
| 1 | 15A3D7 | 156D6E | −3669 |
| 2 | 1566EF | 14F1D6 | −7519 |
| 3 | 156F3E | 155BB0 | −138E |
| 4 | 155F00 | 1544A1 | −1A5F |
| 5 | 154ED8 | 154AB3 | −0425 |
| 6 | 15491C | 15344E | −14CE |
| 7 | 152188 | 14AD15 | −7473 |
| 8 | 1542DE | 152736 | −1BA8 |
| 9 | 15499F | 154707 | −0298 |
| 10 | 153BFE | 150EB5 | −2D49 |

Referring to Table 1, it is found that a difference value between the third maximum focus value FVmax3 at a time when the focus lens moves to the second position DS2 and the second maximum focus value FVmax2 obtained from a previous search process is great enough to be about a 4-digit value.

When a focus value at a final focus position obtained after performing operations S613 through S617 of FIG. 6 is FVmaxf, Table 2 shows resultant values (hexadecimal values) of (FVmaxf−FVmax2) obtained after performing a focusing test 10 times.

TABLE 2

| Test No. | FVmax2 | FVmaxf | FVmaxf − FVmax2 |
| --- | --- | --- | --- |
| 1 | 12F478 | 12F009 | −46F |
| 2 | 12FF65 | 12FEFA | −6B |
| 3 | 12F756 | 12F250 | −506 |
| 4 | 12F9FF | 12FA02 | 3 |
| 5 | 12EECB | 12E95E | −56D |
| 6 | 12DC61 | 12D7B3 | −4AE |
| 7 | 12DC3D | 12DC6A | 2D |
| 8 | 12D419 | 12D33F | −DA |
| 9 | 12C8C6 | 12C878 | −4E |
| 10 | 12BA3F | 12B302 | −73C |

Referring to Table 2, it is found that a difference value between the focus value FVmaxf at a final focus position obtained after performing operations S613 through S617 of FIG. 6 and the second maximum focus value obtained from a previous search process is small enough to be about a 3-digit value. Furthermore, resultant values of test Nos. 4 and 7 are very preferable. That is, the focus value FVmaxf at a final focus position may be greater than the second maximum focus value FVmax2 obtained from a previous search process.

Figure 9:
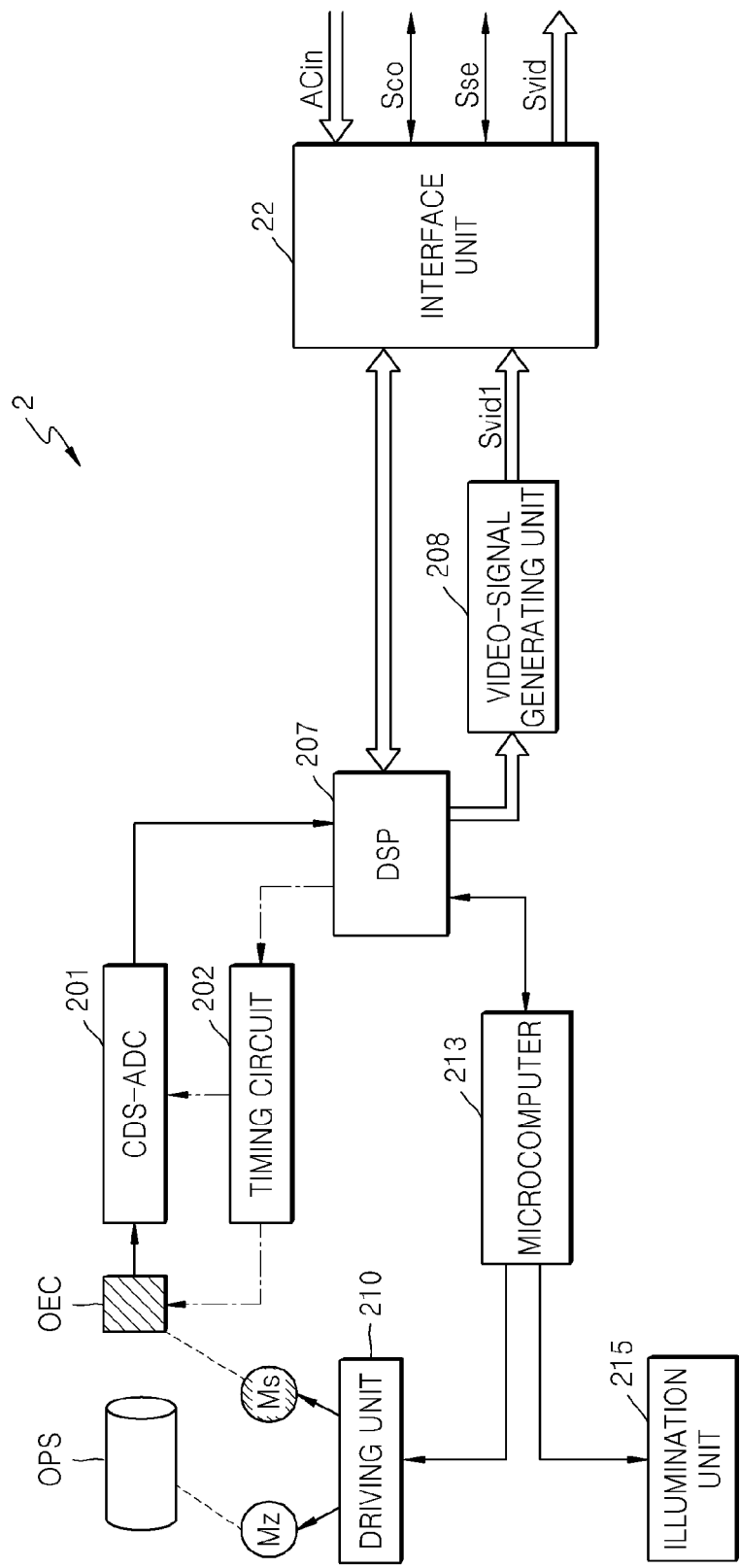
FIG. 9 is a block diagram illustrating the photographing apparatus according to another exemplary embodiment.

FIG. 9 is a block diagram illustrating the photographing apparatus 2 according to another exemplary embodiment. The same reference numerals in FIG. 9 as those in FIG. 2 denote the same elements having the same functions. The photographing apparatus 2 of FIG. 9 is different from the photographing apparatus 2 of FIG. 2 in the following way.

That is, the photographing apparatus 2 of FIG. 2 includes the focus motor Mf instead of a motor of the photoelectric conversion unit OEC, whereas the photographing apparatus 2 of FIG. 9 includes a motor Ms of the photoelectric conversion unit OEC instead of a focus motor. Other elements are the same as those described above with reference to FIG. 2.

In the photographing apparatus 2 including the driving motor Ms of the photoelectric conversion unit OEC, a position at which a maximum focus value is generated is searched for by moving the photoelectric conversion unit OEC in a state where the focus lens in the optical system OPS is fixed. Accordingly, the photographing apparatus 2 may be applied to various uses by replacing the focus lens.

Figure 10:
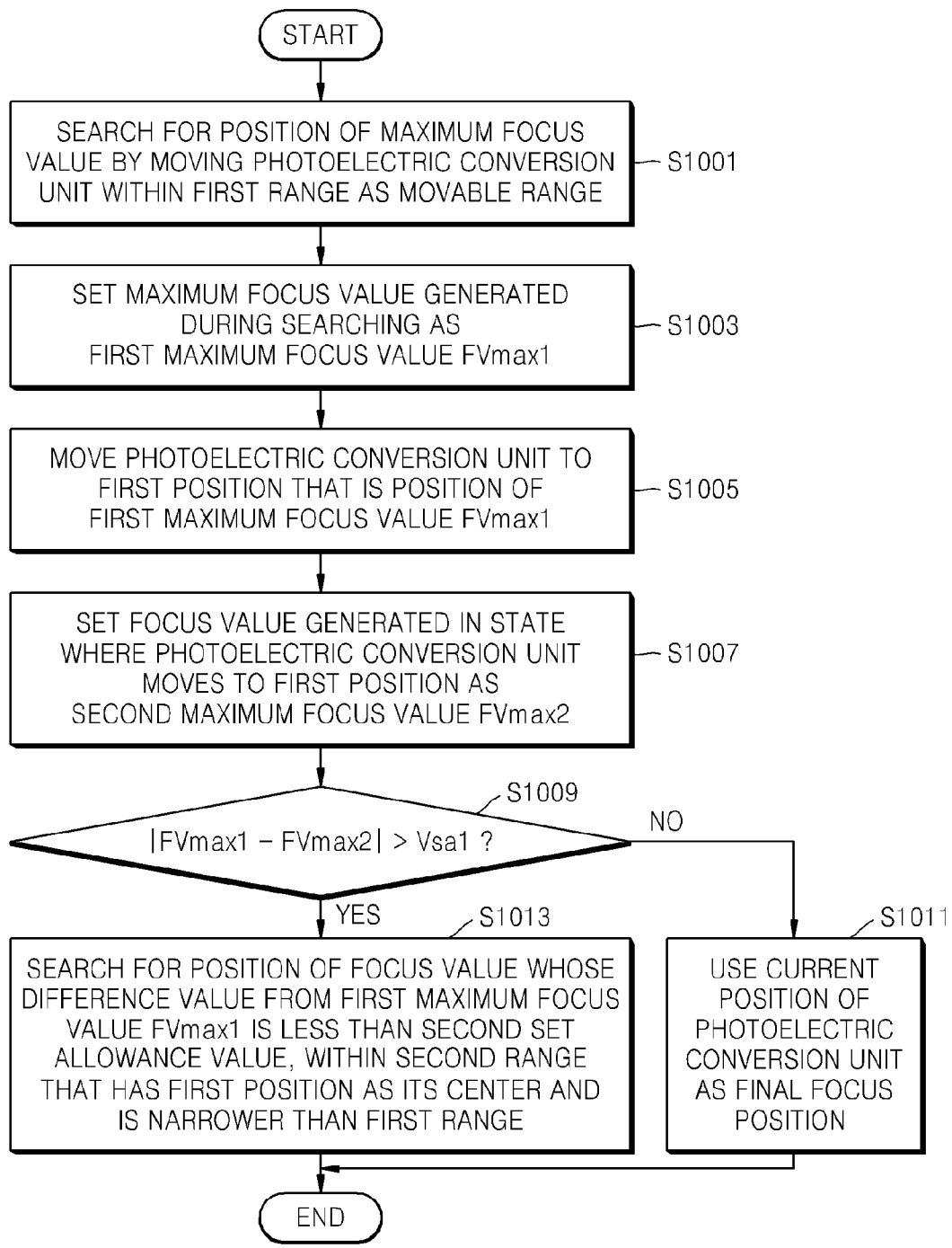
FIG. 10 is a flowchart illustrating a focusing method performed by the DSP that acts as a control unit in the photographing apparatus of FIG. 9, according to an exemplary embodiment.

FIG. 10 is a flowchart illustrating a focusing method performed by the DSP 207 that acts as a control unit in the photographing apparatus 2 of FIG. 9, according to an exemplary embodiment. FIG. 4 is a graph for explaining the focusing method of FIG. 10. In FIG. 4, reference numeral FV denotes a focus value, and DS denotes a position of the photoelectric conversion unit OEC (see FIG. 9). In the current exemplary embodiment, a position value of the position DS of the photoelectric conversion unit OEC (see FIG. 9) is a driving step number of the driving motor Ms (see FIG. 9).

The focusing method of FIG. 10 is different from the focusing method of FIG. 3 in that focusing is performed by moving the photoelectric conversion unit OEC. However, a focusing method performed by the DSP 207 that acts as a control unit in the photographing apparatus 2 of FIG. 9 according to an exemplary embodiment will now be explained with reference to FIGS. 9, 10, and 4.

In operation S1001, the DSP 207 controls the microcomputer 213 to search for a position of a maximum focus value by moving the photoelectric conversion unit OEC within the first range from 0 to 100, which is a movable range. The arrow 1 in FIG. 4 indicates the end of operation S1001.

In this search process, a movement direction of the photoelectric conversion unit OEC, that is, a rotation direction of the driving motor Ms, is constantly used by a set direction. In the current exemplary embodiment, the photoelectric conversion unit OEC moves in a direction in which the position value of the position DS of the photoelectric conversion unit OEC increases. A reason why a constant movement direction of the photoelectric conversion unit OEC is used in this search process is that a rotation direction right before the driving motor Ms temporarily stops is constantly used at a time when the photoelectric conversion unit OEC temporarily stops and the focus value VF is generated. That is, since a rotation direction right before the driving motor Ms temporarily stops is constantly used, inaccuracy due to a backlash of a gear may be reduced.

In operation S1003, the DSP 207 sets a maximum focus value from among focus values generated in operation S1001 as the first maximum focus value FVmax1.

In operation S1005, the DSP 207 moves the photoelectric conversion unit OEC to the first position DS1 that is a position of the first maximum focus value FVmax1. The arrow 2 in FIG. 4 indicates the end of operation S1005. A movement direction right before the photoelectric conversion unit OEC stops at the first position DS1 is constantly used by the set direction. For example, in order to constantly use a rotation direction right before the driving motor Ms stops, the photoelectric conversion unit OEC at the position DS of "100" does not directly stop at the first position DS1 of "60", but stops at the first position of "60" after passing through position values as follows: "100"->"60"->"58"->"60".

In operation S1007, the DSP 207 sets the focus value FV generated in a state where the photoelectric conversion unit OEC moves to the first position DS1 as the second maximum focus value FVmax2.

In operation S1009, the DSP 207 compares a difference value between the first maximum focus value FVmax1 and the second maximum focus value FVmax2 with the first set allowance value Vsa1.

When it is determined in operation S1009 that the difference value between the first maximum focus value FVmax1 and the second maximum focus value FVmax2 is not greater than the first set allowance value Vsa1, the focusing method proceeds to operation S1011. In operation S1011, the DSP 207 uses the first position DS1 of the photoelectric conversion unit OEC at a time of the determination as a final focus position. That is, a point at which the arrow 2 ends in FIG. 4 is used as a final focus position.

When it is determined in operation S1009 that the difference value between the first maximum focus value FVmax1 and the second maximum focus value is greater than the first set allowance value Vsa1, the focusing method proceeds to operation S1013. In operation S1013, the DSP 207 searches for the position DS of the focus value FV, whose difference value from the first maximum focus value FVmax1 is less than the second set allowance value Vsa2, within the second range from 55 to 65 that has the first position DS1 as its center and is narrower than the first range from 0 to 100. The arrow 3 in FIG. 4 indicates a movement path of the photoelectric conversion unit OEC in operation S1013.

That is, when the first maximum focus value FVmax1 is searched for and then the photoelectric conversion unit OEC moves to a position of the first maximum focus value FVmax1, the position DS of the focus value FV which is closest to the first maximum focus value FVmax1 is searched for again around the position, and the position found by the search is used as a final focus position.

Accordingly, in a non-limiting example, a phenomenon in which a final focus position error occurs due to a backlash of a gear of the driving motor Ms may be solved. That is, the photoelectric conversion unit OEC may be accurately placed at an actual position of a maximum focus value.

In operation S1013, the second set allowance value Vsa2 may be the same as the first set allowance value Vsa1, or may be set to be different from the first set allowance value Vsa1 according to various situations.

Also, in operation S1013, the photoelectric conversion unit OEC moves only in the set direction within the second range from 55 to 65, and a position of the photoelectric conversion unit OEC at a time when the position DS of the focus value FV, whose difference value from the first maximum focus value FVmax1 is less than the second set allowance value Vsa2, is first found is used as a final focus position.

Also, when the position DS of the focus lens FV, whose difference value from the first maximum focus value FVmax1 is less than the second set allowance value Vsa2, is not found in operation S1013, a position of a focus value, whose difference value from the first maximum focus value FVmax1 is the smallest within the second range from 55 to 65, is selected as a final focus position. In this case, the arrow 4 in FIG. 4 indicates a movement path of the photoelectric conversion unit OEC. A movement direction right before the photoelectric conversion unit OEC stops at a final focus position is constantly used by the set direction. That is, a rotation direction right before the driving motor Ms stops is constantly used. For example, when a position value of the selected final focus position is "62", the photoelectric conversion unit OEC at the position DS of "65" does not directly stop at a position of "62", but stops at the position of "62" after passing through position values as follows: "65"->"62"->"60"->"62".

A sampling interval between positions at which the focus value FV is generated within the second range from 55 to 65 in operation S1013 is narrower than a sampling interval between positions at which the focus value FV is generated within the first range from 0 to 100 in operation S1001. For example, when a sampling interval for the position DS of the photoelectric conversion unit OEC in operation S1001 is "2", a sampling interval for the position DS of the photoelectric conversion unit OEC in operation S1013 is "1".

Figure 11:
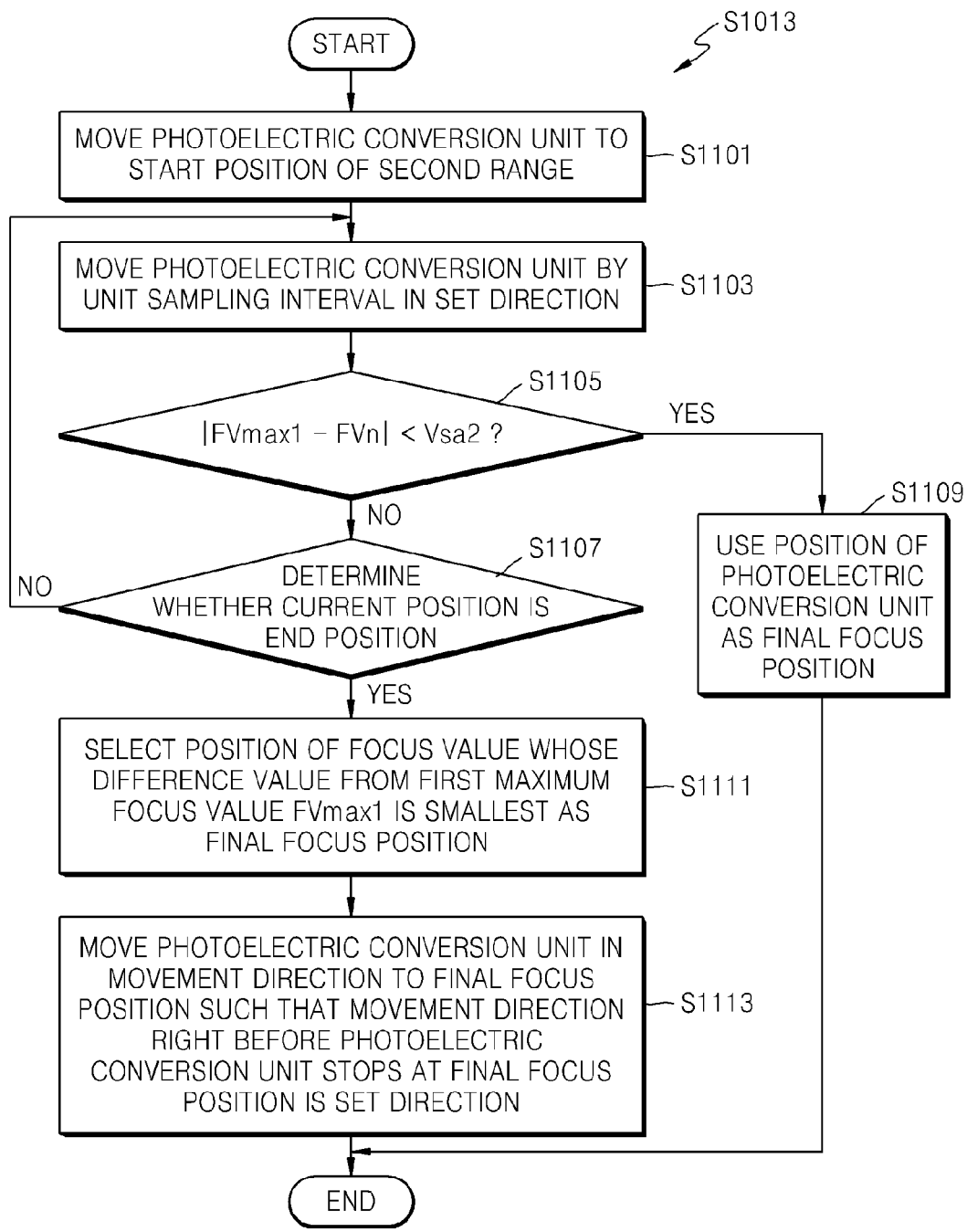
FIG. 11 is a flowchart illustrating an operation of searching for a position of a focus value, whose difference value from a first maximum focus value is less than the second set allowance value, in the focusing method of FIG. 10.

FIG. 11 is a flowchart illustrating operation S1013 of the focusing method of FIG. 10. Operation S1013 of the focusing method of FIG. 10 will be explained in detail with reference to FIGS. 11, 9, and 4.

In operation S1101, the DSP 207 that controls the microcomputer 213 moves the photoelectric conversion unit OEC to the start position of 55 of the second range from 55 to 65.

In operation S1103, the DSP 207 moves the photoelectric conversion unit OEC in the set direction by a unit sampling interval of "1".

As described above, a reason why a movement direction of the photoelectric conversion unit OEC is constantly used in a search process is that a rotation direction right before the driving motor Ms temporarily stops is constantly used at a time when the photoelectric conversion unit OEC temporarily stops and the focus value FV is generated. That is, since a rotation direction right before the driving motor Ms temporarily stops is constantly used, inaccuracy due to a backlash of a gear may be reduced.

In operation S1105, the DSP 207 determines whether a difference value between the first maximum focus value FVmax1 and the current focus value FVn is less than the second set allowance value Vsa2.

When it is determined in operation S1105 that the difference value between the first maximum focus value FVmax1 and the current focus value FVn is less than the second set allowance value Vsa2, the focusing method proceeds to operation S1109. In operation S1109, the DSP 207 uses a current position of the photoelectric conversion unit OEC as a final focus position.

When it is determined in operation S1105 that the difference value between the first maximum focus value FVmax1 and the current focus value FVn is not less than the second set allowance value Vsa2, the focusing method proceeds to operation to operation S1107. In operation S1107, the DSP 207 determines whether the current position is an end position.

When it is determined in operation S1107 that the current position is not an end position, operations S1103 and subsequent operations are repeatedly performed, and when it is determined in operation S1107 that the current position is an end position, operations S1111 and S1113 are performed.

Since the position DS of the current focus value FVn, whose difference value from the first maximum focus value FVmax1 is less than the second set allowance value Vsa2, is not found, in operation S1111 a position of a focus value (for example, a position of 62), whose difference value from the first maximum focus value FVmax1 is the smallest within the second range from 55 to 65, is selected as a final focus position.

In operation S1113, the DSP 207 moves the photoelectric conversion unit OEC in a movement direction such that the movement direction right before the photoelectric conversion unit OEC stops at a final focus position is the set direction. In this case, the arrow 4 in FIG. 4 indicates a movement path of the photoelectric conversion unit OEC. For example, when a position value of the selected final focus position is "62", the photoelectric conversion unit OEC at the position DS of "65" does not directly stop at a position of "62", but stops at the position of "62" after passing through position values as follows: "65"->"62"->"60"->"62".

Figure 12:
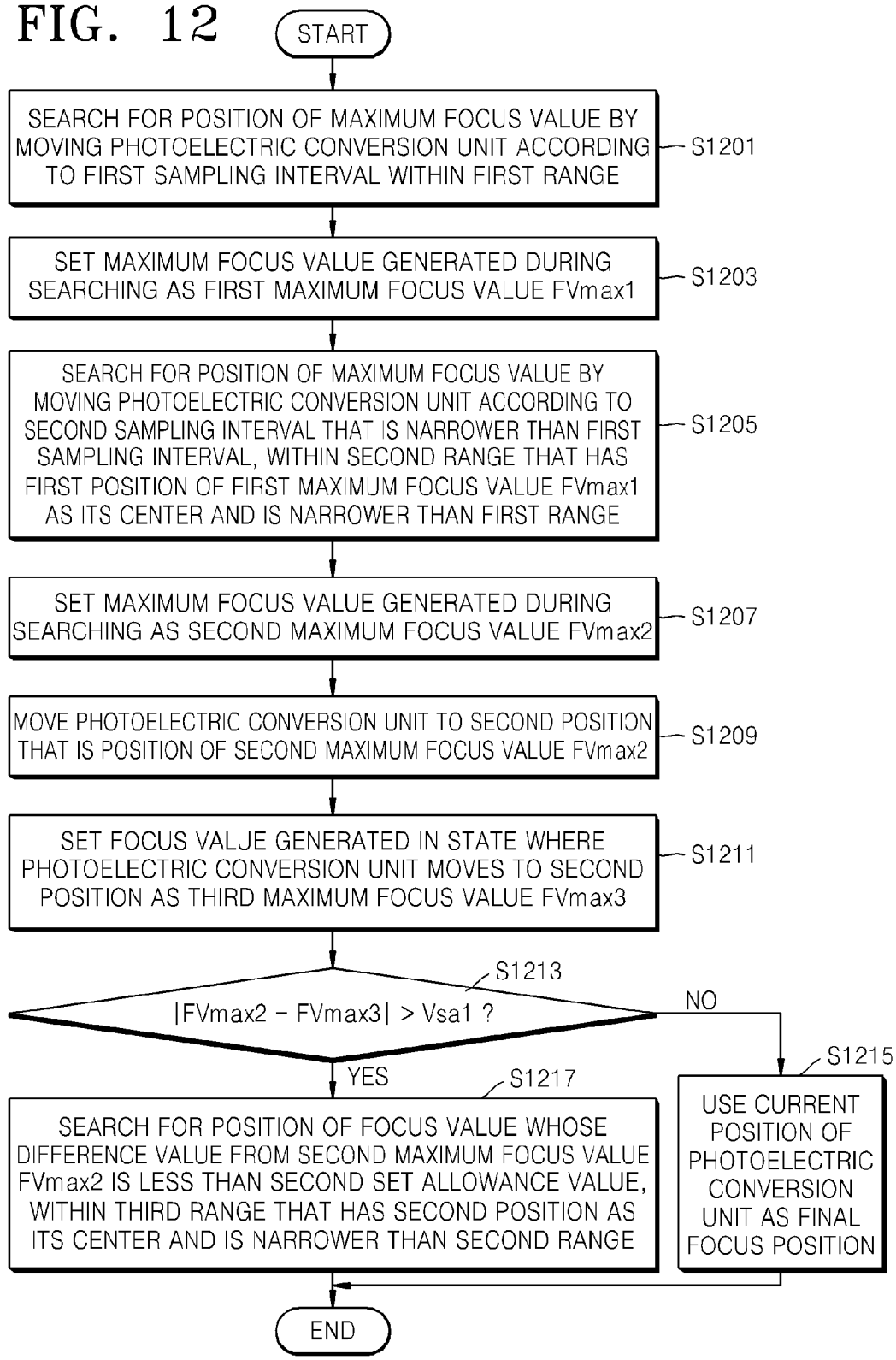
FIG. 12 is a flowchart illustrating a focusing method performed by the DSP that acts as a control unit in the photographing apparatus of FIG. 9, according to another exemplary embodiment.

FIG. 12 is a flowchart illustrating a focusing method performed by the DSP 207 that acts as a control unit in the photographing apparatus 2 of FIG. 9, according to another exemplary embodiment. Focusing using the focusing method of FIG. 12 may end earlier than focusing using the focusing method of FIG. 10.

The focusing method of FIG. 12 is different from the focusing method of FIG. 6 only in that focusing is performed by using the photoelectric conversion unit OEC. However, a focusing method performed by the DSP 207 that acts as a control unit in the photographing apparatus 2 of FIG. 9 according to another exemplary embodiment will now be explained with reference to FIGS. 12, 9, and 7.

In operation S1201, the DSP 207 controls the microcomputer 213 to search for a position of a maximum focus value by moving the photoelectric conversion unit OEC according to a first sampling interval (for example, 4 driving steps) within the first range from 0 to 100, which is a movable range. The arrow 1 in FIG. 7 indicates the end of operation S1201.

In operation S1203, the DSP 207 sets a maximum focus value from among focus values generated in operation S1201 as the first maximum focus value FVmax1.

In operation S1205, the DSP 207 searches for a position of a maximum focus value by moving the photoelectric conversion unit OEC according to a second sampling interval (for example, 2 driving steps) that is narrower than the first sampling interval, within the second range from 40 to 70 that has the first position DS1 of the first maximum focus value FVmax1 as its center and is narrower than the first range from 0 to 100. The arrow 2 in FIG. 7 indicates a movement path of the focus lens in operation S1205.

In operation S1207, the DSP 207 sets a maximum focus value generated in operation S1205 as the second maximum focus value FVmax2.

In operation S1209, the DSP 207 moves the photoelectric conversion unit OEC to the second position DS2 that is a position of the second maximum focus value FVmax2. The arrow 3 in FIG. 7 indicates the end of operation S1209.

As described above, a movement direction right before the photoelectric conversion unit OEC stops at the second position DS2 is constantly used by a set direction. For example, in order to constantly use a rotation direction right before the driving motor Ms stops, the photoelectric conversion unit OEC at a position of "70" does not directly stop at the second position DS2 of "60", but stops at the second position DS2 of "60" after passing through position values as follows: "70"->"60"->"58"->"60".

In operation S1211, the DSP 207 sets the focus value FV generated in a state where the photoelectric conversion unit OEC moves to the second position DS2 as the third maximum focus value FVmax3.

In operation S1213, the DSP 207 compares a difference value between the second maximum focus value FVmax2 and the third maximum focus value FVmax2 with the first set allowance value Vsa1.

When it is determined in operation S1213 that the difference value between the second maximum focus value FVmax2 and the third maximum focus value FVmax3 is not greater than the first set allowance value Vsa1, the focusing method proceeds to operation S1215. In operation S1215, the DSP 207 uses a current position, that is, the second position DS2, of the photoelectric conversion unit OEC at a time of the determination as a final focus position. That is, a point at which the arrow 3 in FIG. 7 ends is used as a final focus position.

When it is determined in operation S1213 that the difference value between the second maximum focus value FVmax2 and the third maximum focus value FVmax3 is greater than the first set allowance value Vsa1, the focusing method proceeds to operation S1217. In operation S1217, the DSP 207 searches for the position DS of the focus value FV, whose difference value from the second maximum focus value FVmax2 is less than the second set allowance value Vsa2, within the third range from 55 to 65 that has the second position DS2 as its center and is narrower than the second range from 40 to 70. The arrow 4 in FIG. 7 indicates a movement path of the photoelectric conversion unit OEC in operation S1217. Operation S1217 is the same as operation S1013 of FIG. 10.

For example, in operation S1217, the photoelectric conversion unit OEC moves only in the set direction within the third range from 55 to 65, and a position of the photoelectric conversion unit OEC at a time when the position DS of the focus value FV, whose difference value from the second maximum focus value FVmax2 is less than the second set allowance value Vsa2, is first found is used as a final focus position.

Also, when the position DS of the focus value FV, whose difference value from the second maximum focus value FVmax2 is less than the second set allowance value Vsa2, is not found in operation S1217, a position of a focus value (for example, a position of 62), whose difference from the second maximum focus value FVmax2 is the smallest within the third range from 55 to 65, is used as a final focus position. In this case, the arrow 5 in FIG. 7 indicates a movement through which the photoelectric conversion unit OEC moves from a position of "65" to a final focus position of "62".

In sum of FIG. 12, when the second maximum focus value FVmax2 is searched for and then the photoelectric conversion unit OEC moves to a position of the second maximum focus value FVmax2, the position DS of the focus value FV that is closest to the second maximum focus value FVmax2 is searched for again around the position, and the position found by the search is used as a final focus position.

Accordingly, in a non-limiting example, a phenomenon in which a final focus position error occurs due to a backlash of a gear of the driving motor Ms may be solved. That is, the photoelectric conversion unit OEC may be accurately placed at an actual position of a maximum focus value.

Figure 13:
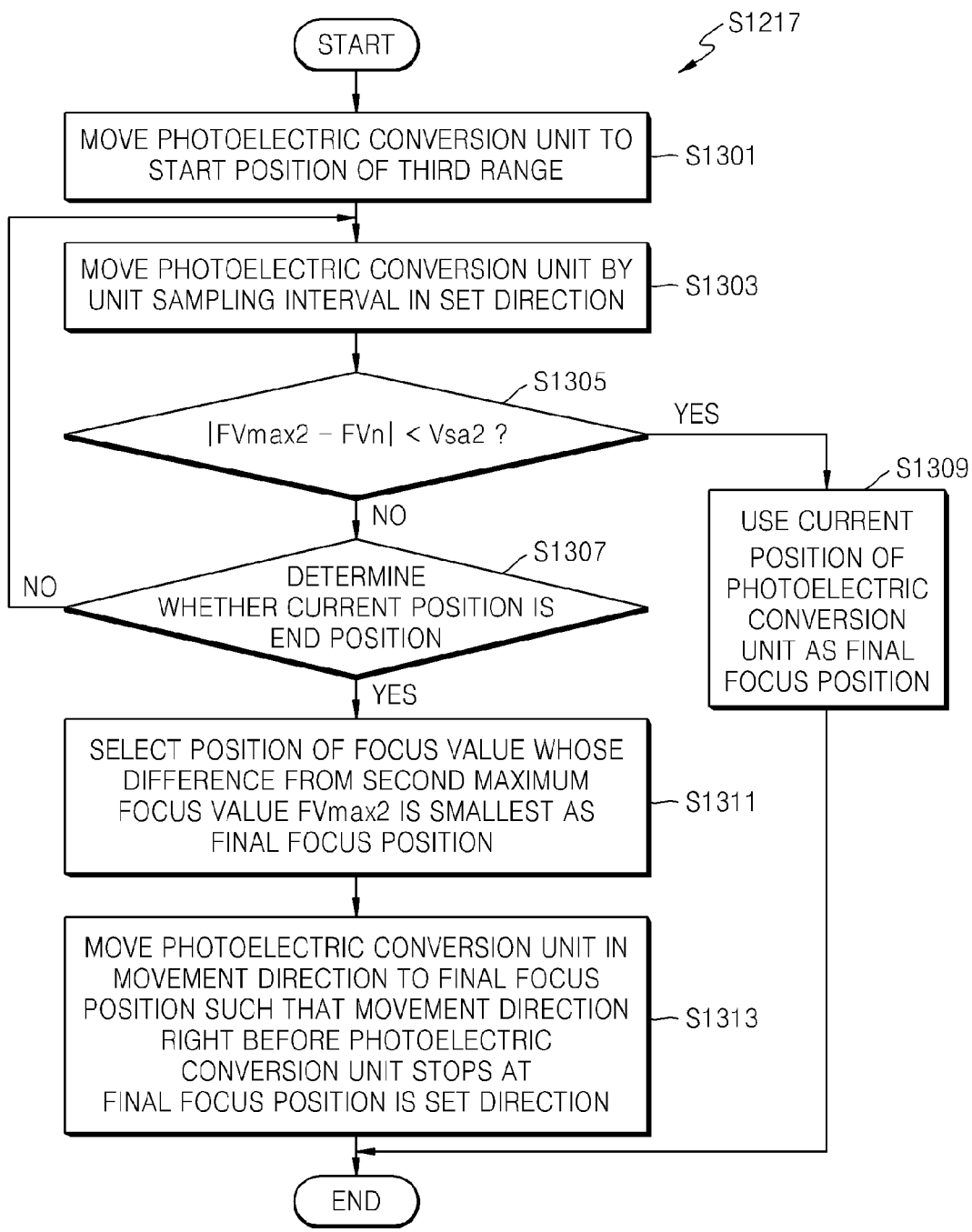
FIG. 13 is a flowchart illustrating an operation of searching for a position of a focus value, whose difference value from the second maximum focus value is less than the second set allowance value, in the focusing method of FIG. 12.

FIG. 13 is a flowchart illustrating operation S1217 of the focusing method of FIG. 12. Operation S1217 of the focusing method of FIG. 12 will be explained in detail with reference to FIGS. 13, 9, and 7.

In operation S1301, the DSP 207 that controls the microcomputer 213 moves the photoelectric conversion unit OEC to the start position of 55 of the third range from 55 to 65.

In operation S1303, the DSP 207 moves the photoelectric conversion unit OEC in the set direction by a unit sampling interval of "1".

In operation S1305, the DSP 207 determines whether a difference value between the second maximum focus value FVmax2 and the current focus value FVn is less than the second set allowance value Vsa2.

When it is determined in operation S1305 that the difference value between the second maximum focus value FVmax2 and the current focus value FVn is less than the second set allowance value Vsa2, the focusing method proceeds to operation S1309. In operation S1309, the DSP 207 uses a current position of the photoelectric conversion unit OEC as a final focus position.

When it is determined in operation S1305 that the difference value between the second maximum focus value FVmax2 and the current focus value FVn is not less than the second set allowance value Vsa2, the focusing method proceeds to operation S1307. In operation S1307, the DSP 207 determines whether the current position is an end position.

When it is determined in operation S1307 that the current position is not an end position, operations S1303 and subsequent operations are repeatedly performed, and when it is determined in operation S1307 that the current position is an end position, operations S1311 and S1313 are performed.

Since the DSP 207 does not find the position DS of the current focus value FVn, whose difference value from the second maximum focus value FVmax2 is less than the second set allowance value Vsa2, in operation S1311 a position of a focus value (for example, a position of 62), whose difference value from the second maximum focus value FVmax2 is the smallest within the third range from 55 to 65, is selected as a final focus position.

In operation S1313, the DSP 207 moves the photoelectric conversion unit OEC in a movement direction to a final focus position such that the movement direction right before the photoelectric conversion unit OEC stops at the final focus position is the set direction. In this case, the arrow 5 in FIG. 7 indicates a movement path of the photoelectric conversion unit OEC.

As described above, according to a focusing method of a photographing apparatus and a photographing apparatus adopting the focusing method of the one or more exemplary embodiments, when a maximum focus value is searched for and then a focus lens or a photoelectric conversion unit moves to a position of the maximum focus value, a position of a focus value that is closest to the maximum focus value is searched for again around the position, and the position found by the search is used as a final focus position.

Accordingly, in a non-limiting example, a phenomenon in which a final focus position error occurs due to a backlash of a gear of a driving motor may be solved. That is, the focus lens or the photoelectric conversion unit may be accurately placed at an actual position of the maximum focus value.

While certain exemplary embodiments have been particularly shown and described, it will be understood by those of ordinary skill in the art that various changes in form and details may be made therein without departing from the spirit and scope of the inventive concept as defined by the appended claims.

What is claimed is:

1. A focusing method for focusing a photographing apparatus comprising a focus lens and a photoelectric conversion unit, the focusing method comprising:

(a) searching for a position of a maximum focus value by moving the focus lens within a first range, and setting the maximum focus value generated during the searching as a first maximum focus value;
(b) moving the focus lens to a first position that is a position of the first maximum focus value;
(c) setting a focus value generated when the focus lens moves to the first position as a second maximum focus value; and
(d) determining whether a difference value between the first maximum focus value and the second maximum focus value is greater than a first set allowance value, and if it is determined that the difference value is greater than the first set allowance value, searching for a position of a focus value of which a difference value from the first maximum focus value is less than a second set allowance value, within a second range that has the first position as its center and is narrower than the first range,
wherein in operation (b),
a direction of movement of the focus lens or a direction of movement of a motor moving the focus lens immediately before the focus lens is moved to the first position is a set direction that is always the same, and
wherein in operation (d),
the focus lens moves only in the set direction and within the second range, and
the position of the focus lens, at a time when the position of the focus value, of which a difference value from the first maximum focus value is less than the second set allowance value, is used as a final focus position.

2. A focusing method for focusing a photographing apparatus comprising a focus lens and a photoelectric conversion unit, the focusing method comprising:
(a) searching for a position of a maximum focus value by moving the focus lens within a first range, and setting the maximum focus value generated during the searching as a first maximum focus value;
(b) moving the focus lens to a first position that is a position of the first maximum focus value;
(c) setting a focus value generated when the focus lens moves to the first position as a second maximum focus value; and
(d) determining whether a difference value between the first maximum focus value and the second maximum focus value is greater than a first set allowance value, and if it is determined that the difference value is greater than the first set allowance value, searching for a position of a focus value of which a difference value from the first maximum focus value is less than a second set allowance value, within a second range that has the first position as its center and is narrower than the first range,
wherein in operation (b),
a direction of movement of the focus lens or a direction of movement of a motor moving the focus lens immediately before the focus lens is moved to the first position is a set direction that is always the same, and
wherein in operation (d),
when the position of the focus value, of which a difference value from the first maximum focus value is less than the second set allowance value, is not found, a position of a focus value, of which a difference value from the first maximum focus value is smallest among other focus values within the second range, is selected as a final focus position.

3. The focusing method of claim 2, wherein in operation (d),
when the position of the focus value, of which a difference value from the first maximum focus value is less than the second set allowance value, is not found, the direction of movement of the focus lens or the direction of movement of the motor moving the focus lens immediately before the focus lens stops at the final focus position is the set direction.

4. A focusing method for focusing a photographing apparatus comprising a focus lens and a photoelectric conversion unit, the focusing method comprising:
(a) searching for a position of a maximum focus value by moving the photoelectric conversion unit within a first range, and setting the maximum focus value generated during the searching as a first maximum focus value;
(b) moving the photoelectric conversion unit to a first position that is a position of the first maximum focus value;
(c) setting a focus value generated when the photoelectric conversion unit moves to the first position as a second maximum focus value; and
(d) determining whether a difference value between the first maximum focus value and the second maximum focus value is greater than a first set allowance value, and if it is determined that the difference value is greater than the first set allowance value, searching for a position of a focus value of which a difference value from the first maximum focus value is less than a second set allowance value, within a second range that has the first position as its center and is narrower than the first range,
wherein in operation (b),
a direction of movement of the photoelectric conversion unit or a direction of movement of a motor moving the photoelectric conversion unit immediately before the photoelectric conversion unit stops at the first position is a set direction that is always the same, and
wherein in operation (d),
the photoelectric conversion unit moves only in the set direction and within the second range, and
the position of the photoelectric conversion unit, at a time when the position of the focus value, of which a difference value from the first maximum focus value is less than the second set allowance value, the position of the focus lens is used as a final focus position.

5. A focusing method for focusing a photographing apparatus comprising a focus lens and a photoelectric conversion unit, the focusing method comprising:
(a) searching for a position of a maximum focus value by moving the photoelectric conversion unit within a first range, and setting the maximum focus value generated during the searching as a first maximum focus value;
(b) moving the photoelectric conversion unit to a first position that is a position of the first maximum focus value;
(c) setting a focus value generated when the photoelectric conversion unit moves to the first position as a second maximum focus value; and
(d) determining whether a difference value between the first maximum focus value and the second maximum focus value is greater than a first set allowance value, and if it is determined that the difference value is greater than the first set allowance value, searching for a position of a focus value of which a difference value from the first maximum focus value is less than a second set allowance value, within a second range that has the first position as its center and is narrower than the first range,
wherein in operation (b),
a direction of movement of the photoelectric conversion unit or a direction of movement of a motor moving the photoelectric conversion unit immediately before the photoelectric conversion unit stops at the first position is a set direction that is always the same, and wherein in operation (d), when the position of the focus value, of which a difference value from the first maximum focus value is less than the second set allowance value, is not found, a position of a focus value, of which a difference value from the first maximum focus value is smallest among other focus values, is selected as a final focus position.

6. The focusing method of claim 5, wherein in operation (d), when the position of the focus value, of which a difference value from the first maximum focus value is less than the second set allowance value, is not found, the direction of movement of the photoelectric conversion unit or the direction of movement of the motor moving the photoelectric conversion unit immediately before the photoelectric conversion unit stops at the final focus position is the set direction.

* * * * *